(12) United States Patent
Jung et al.

(10) Patent No.: US 11,294,600 B2
(45) Date of Patent: Apr. 5, 2022

(54) STORAGE DEVICE INTERFACING WITH HOST DEVICE AND OPERATING METHOD OF THE STORAGE DEVICE

(71) Applicant: SAMSUNG ELECTRONICS CO., LTD., Suwon-si (KR)

(72) Inventors: Brian Myungjune Jung, Suwon-si (KR); Jooyoung Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 8 days.

(21) Appl. No.: 17/034,169

(22) Filed: Sep. 28, 2020

(65) Prior Publication Data
US 2021/0181989 A1 Jun. 17, 2021

(30) Foreign Application Priority Data
Dec. 12, 2019 (KR) .................. 10-2019-0166003

(51) Int. Cl.
*G06F 12/00* (2006.01)
*G06F 3/06* (2006.01)
*G06F 13/00* (2006.01)
*G06F 13/28* (2006.01)

(52) U.S. Cl.
CPC .......... *G06F 3/0659* (2013.01); *G06F 3/0604* (2013.01); *G06F 3/067* (2013.01); *G06F 3/0613* (2013.01); *G06F 3/0653* (2013.01); *G06F 3/0664* (2013.01)

(58) Field of Classification Search
CPC ...... G06F 3/0659; G06F 3/0653; G06F 3/067; G06F 3/0604; G06F 3/0613; G06F 3/0664
See application file for complete search history.

(56) References Cited

U.S. PATENT DOCUMENTS

| | | | |
|---|---|---|---|
| 7,061,861 B1 * | 6/2006 | Mekkittikul | ........ H04L 12/2852 370/230 |
| 7,685,342 B2 | 3/2010 | Shiraki et al. | |
| 7,689,708 B1 | 3/2010 | Cihla et al. | |
| 9,047,273 B2 | 6/2015 | Jeddeloh | |
| 10,037,162 B2 | 7/2018 | Makida et al. | |
| 10,366,766 B2 | 7/2019 | Benisty | |
| 10,387,078 B1 * | 8/2019 | Benisty | ................. G06F 3/0679 |
| 2006/0164989 A1 * | 7/2006 | Hart | ...................... H04L 47/263 370/235 |

(Continued)

*Primary Examiner* — Mark A Giardino, Jr.
(74) *Attorney, Agent, or Firm* — F. Chau & Associates, LLC

(57) ABSTRACT

An operating method of a storage device including a plurality of memory chips and a connection including a network command queue and a virtual command queue includes receiving a plurality of commands from a host device using the connection, selecting a physical command queue allocated to the connection among a plurality of physical command queues corresponding to the plurality of memory chips, sequentially storing the plurality of commands in the network command queue and the virtual command queue, and transmitting a command throttling request to the host device in response to the plurality of commands based on a queue depth of the network command queue and adjusting a number of physical command queues allocated to the connection based on a queue depth of the virtual command queue.

20 Claims, 13 Drawing Sheets

(56) References Cited

U.S. PATENT DOCUMENTS

| | | | |
|---|---|---|---|
| 2016/0004438 A1* | 1/2016 | Moon | G06F 3/0631 |
| | | | 711/103 |
| 2017/0171091 A1* | 6/2017 | Nayak | H04L 47/25 |
| 2017/0214631 A1 | 7/2017 | Zhang et al. | |
| 2017/0251077 A1* | 8/2017 | Kumar Eerpini | H04L 47/6215 |
| 2017/0270042 A1 | 9/2017 | Tseng et al. | |
| 2017/0344284 A1 | 11/2017 | Choi et al. | |
| 2018/0307521 A1* | 10/2018 | Pinto | G06F 9/546 |
| 2021/0211382 A1* | 7/2021 | Chen | H04L 49/3045 |

* cited by examiner

STORAGE DEVICE INTERFACING WITH HOST DEVICE AND OPERATING METHOD OF THE STORAGE DEVICE

CROSS-REFERENCE TO RELATED APPLICATION

This application claims priority under 35 U.S.C. § 119 to Korean Patent Application No. 10-2019-0166003, filed on Dec. 12, 2019 in the Korean Intellectual Property Office, the disclosure of which is incorporated by reference herein in its entirety.

TECHNICAL FIELD

Exemplary embodiments of the inventive concept relate to a storage device and an operating method thereof, and more particularly, to a storage device interfacing with a host device and an operating method of the storage device.

DISCUSSION OF RELATED ART

Non-volatile memory may retain data stored therein even when power is cut off. Recently, storage devices, such as embedded multimedia cards (eMMCs), universal flash storage (UFS), solid state drives (SSDs), and memory cards, including flash-based non-volatile memory have been widely used. Storage devices are useful for storing or moving a large amount of data.

A data processing system including a storage device may be referred to as a storage system, and may further include a host device. The host device may be connected to the storage device through various interface standards. It is desirable to increase data processing performance by reducing congestion of data processing, such as writing and reading, during an interface.

SUMMARY

According to an exemplary embodiment of the inventive concept, in an operating method of a storage device including a plurality of memory chips and a connection including a network command queue and a virtual command queue, the operating method includes receiving a plurality of commands from a host device using the connection, selecting a physical command queue allocated to the connection among a plurality of physical command queues corresponding to the plurality of memory chips, sequentially storing the plurality of commands in the network command queue and the virtual command queue, and transmitting a command throttling request to the host device in response to the plurality of commands based on a queue depth of the network command queue and adjusting a number of physical command queues allocated to the connection based on a queue depth of the virtual command queue.

According to an exemplary embodiment of the inventive concept, a storage device configured to interface with a host device includes a memory including a plurality of memory chips, and a storage controller configured to control operations of the memory. The storage controller includes a plurality of connections including a network command queue and a virtual command queue and configured to receive a command from the host device, and a plurality of physical command queues respectively connected to the plurality of memory chips and each configured to provide the command to a corresponding one of the plurality of memory chips. The storage controller is configured to transmit a command throttling request to the host device based on a queue depth of the network command queue and to adjust a number of physical command queues connected to the virtual command queue based on a queue depth of the virtual command queue.

According to an exemplary embodiment of the inventive concept, a storage device includes a memory including a plurality of memory chips, and a storage controller configured to control operations of the memory. The storage controller includes a plurality of connections including a network command queue and a virtual command queue and configured to receive a command from a host device. The storage controller is configured to transmit a command throttling request to the host device based on a queue depth of the network command queue, and to adjust, based on a queue depth of the virtual command queue, a number of memory chips provided with the command enqueued to the virtual command queue.

BRIEF DESCRIPTION OF THE DRAWINGS

The above and other features of the inventive concept will be more clearly understood by describing in detail exemplary embodiments thereof with reference to the accompanying drawings.

DETAILED DESCRIPTION OF THE EMBODIMENTS

Figure 1:
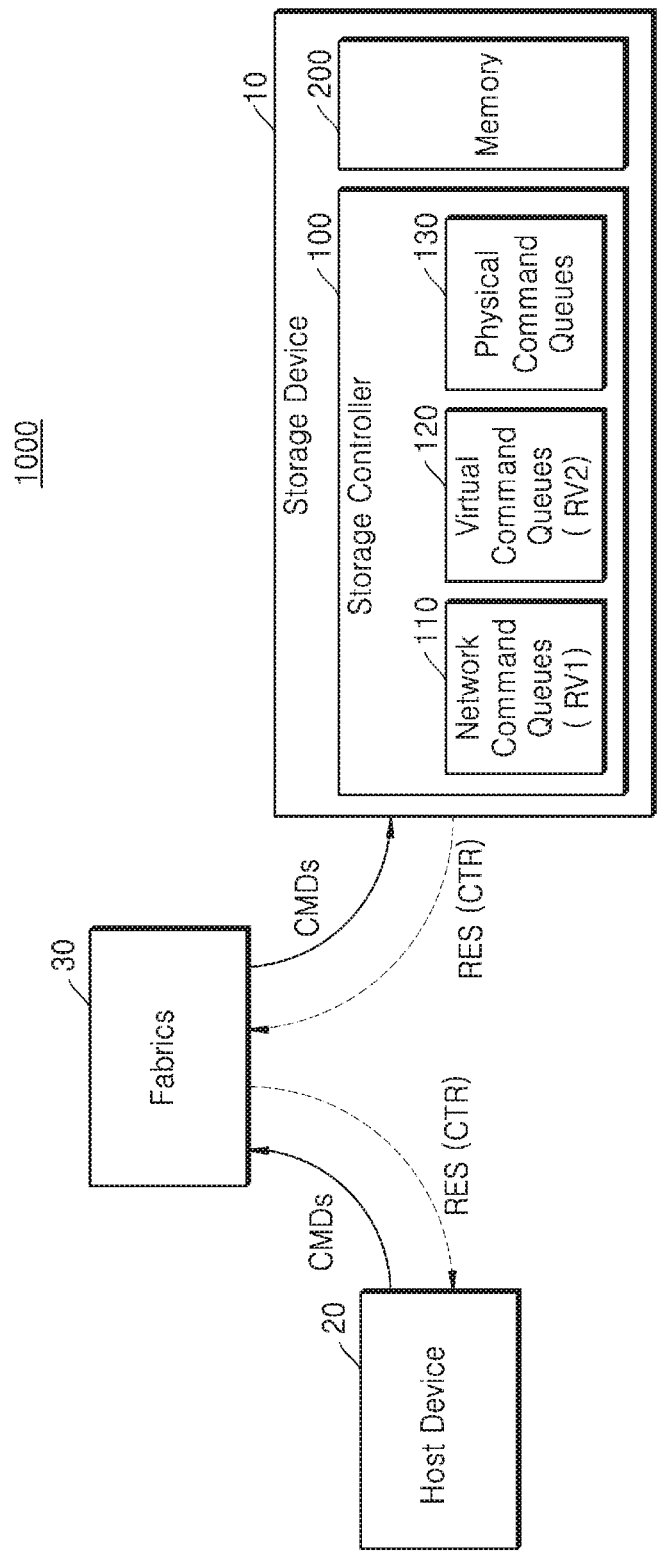
FIG. 1 is a block diagram of a storage system according to an exemplary embodiment of the inventive concept.

Exemplary embodiments of the inventive concept provide a storage device for increasing data processing performance by reducing data processing congestion between a host device and the storage device, and an operating method of the storage device.

Exemplary embodiments of the inventive concept will be described in detail hereinafter with reference to the attached drawings. Like reference numerals may refer to like elements throughout this application.

FIG. 1 is a block diagram of a storage system according to an exemplary embodiment of the inventive concept.

A storage system 1000 may include, for example, a personal computer (PC), a data server, network-attached storage (NAS), an Internet of things (IoT) device, or a portable electronic device. The portable electronic device may include a laptop computer, a mobile phone, a smart phone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, or a wearable device.

Referring to FIG. 1, the storage system 1000 may include a host device 20 and a storage device 10. The storage device 10 may include a storage controller 100 and a memory 200. When the storage device 10 stores data in a non-volatile manner, the memory 200 may include a non-volatile memory chip.

The storage device 10 may include storage media to store data in response to a request from the host device 20. In an exemplary embodiment of the inventive concept, the storage device 10 may include a solid state drive (SSD). For example, the storage device 10 may include an Ethernet-attached storage drive (EASD). The memory 200 may include a plurality of flash memory chips (e.g., NAND memory chips) storing data in a non-volatile manner.

The host device 20 may communicate with the storage device 10 through various interfaces. In an exemplary embodiment of the inventive concept, the host device 20 may communicate with the storage device 10 through various interfaces such as a universal serial bus (USB) interface, a multimedia card (MMC) interface, a peripheral component interconnect express (PCI Express) interface, an advanced technology attachment (ATA) interface, a serial ATA (SATA) interface, a parallel ATA (PATA) interface, a small computer system interface (SCSI), a serial attached SCSI (SAS), an enhanced small disk interface (ESDI), or an integrated drive electronics (IDE) interface. For example, a non-volatile memory express (NVMe) interface may be used as an interface for the storage device 10 such as an SSD, and a non-volatile memory express over fabrics (NVMeoF) interface may be applied to the storage system 1000.

In an exemplary embodiment of the inventive concept, the storage system 1000 may include fabrics 30. The host device 20 may transmit a plurality of commands CMDs to the fabrics 30, and the storage device 10 may receive the commands CMDs from the host device 20 through the fabrics 30. For example, the host device 20 may transmit a packet including the commands CMDs, and the storage device 10 may receive the packet including the commands CMDs. In an exemplary embodiment of the inventive concept, the fabrics 30 may correspond to Ethernet and may include at least one switch. However, the inventive concept is not limited thereto. In an exemplary embodiment of the inventive concept, the storage device 10 may be directly connected to the host device 20.

The storage device 10 may transmit a response RES in response to the commands CMDs to the host device 20 through the fabrics 30. In an exemplary embodiment of the inventive concept, when the commands CMDs received by the storage device 10 exceed the connection bandwidth of the storage device 10, the storage device 10 may transmit a command throttling request CTR to the host device 20 as a response to the commands CMDs. In an exemplary embodiment of the inventive concept, the command throttling request CTR may include information about the connection bandwidth.

However, the storage device 10 is not limited thereto and may include a flash memory device including at least one flash memory chip. In an exemplary embodiment of the inventive concept, the storage device 10 may be an embedded memory of the storage system 1000. For example, the storage device 10 may include an embedded MMC (eMMC) or an embedded universal flash storage (UFS) memory device. In an exemplary embodiment of the inventive concept, the storage device 10 may be an external memory removably mounted on the storage system 1000. For example, the storage device 10 may include a UFS memory card, a compact flash (CF) card, a secure digital (SD) card, a micro-SD card, a mini-SD card, an extreme digital (xD) card, or a memory stick.

When the storage device 10 includes flash memory, the flash memory may include a two-dimensional (2D) NAND memory array or a three-dimensional (3D) or vertical NAND (VNAND) memory array. The 3D memory array may be monolithically formed with at least one physical level of arrays of memory cells, which have an active region on a silicon substrate, or a circuit, which is involved in the operation of the memory cells and formed on or in the silicon substrate. The term "monolithic" means that layers of each level of an array are directly stacked on layers of an underlying level of the array.

In an exemplary embodiment of the inventive concept, the 3D memory array includes vertical NAND strings which are arranged in a vertical direction so that at least one memory cell is placed on another memory cell. The memory cell may include a charge trap layer.

Structures of a 3D memory array, in which the 3D memory array includes a plurality of levels, and word lines and/or bit lines are shared by the levels, are disclosed in U.S. Pat. Nos. 7,679,133, 8,553,466, 8,654,587, 8,559,235, and U.S. Patent Application Publication No. 2011/0233648, the disclosures of which are incorporated by reference herein in their entireties.

In an exemplary embodiment of the inventive concept, the storage device 10 may include other kinds of non-volatile memory. For example, the storage device 10 may include various types of non-volatile memory, such as magnetic random access memory (MRAM), spin-transfer torque MRAM, conductive bridging RAM (CBRAM), ferroelectric RAM (FeRAM), phase RAM (PRAM), resistive RAM, nanotube RAM, polymer RAM (PoRAM), nano floating gate memory (NFGM), holographic memory, molecular electronics memory, or insulator resistance change memory.

The storage controller 100 may control all operations of the memory 200. For example, the storage controller 100 may control data exchange between the memory 200 and the host device 20. For example, the storage controller 100 may control the memory 200 to write or read data at the request of the host device 20. The storage controller 100 may control a series of internal operations (e.g., performance control, merging, wear leveling, etc.) for the characteristics or efficient management of non-volatile memory.

The storage controller 100 may include a plurality of network command queues 110, a plurality of virtual command queues 120, and a plurality of physical command queues 130. Each of the network command queues 110 may receive and temporarily buffer the commands CMDs and provide the commands CMDs to a corresponding one of the virtual command queues 120.

In an exemplary embodiment of the inventive concept, one of the network command queues 110 may have a corresponding relationship with one of the virtual command queues 120, and a network command queue and a corresponding virtual command queue may form a connection. In other words, the network command queues 110 may correspond to the virtual command queues 120 one to one, and the storage controller 100 may include the same numbers of network command queues 110 and virtual command queues 120.

In an exemplary embodiment of the inventive concept, each of the physical command queues 130 may be dedicated to a particular one of a plurality of memory chips include in the memory 200. In other words, the physical command queues 130 may correspond to the memory chips one to one, and commands stored in one of the physical command queues 130 may be transmitted to a certain memory chip. However, the inventive concept is not limited to the illustration in FIG. 1, and the physical command queues 130 may be included in the memory 200.

In an exemplary embodiment of the inventive concept, the storage controller 100 may transmit the command throttling request CTR to the host device 20 when a queue depth, e.g., the number of commands enqueued to each of the network command queues 110, exceeds a first reference value RV1. Therefore, the host device 20 may maintain an agreed bandwidth when transmitting the commands CMDs to the storage device 10. In an exemplary embodiment of the inventive concept, when the queue depth of each of the virtual command queues 120 exceeds a second reference value RV2, the storage controller 100 may increase the number of physical command queues allocated to a virtual command queue having the queue depth exceeding the second reference value RV2. As the number of physical command queues connected to a single virtual command queue increases, a speed of processing commands enqueued to the virtual command queue increases. Accordingly, data processing congestion of the storage device 10 may be reduced and data processing performance thereof may be increased.

Figure 2:
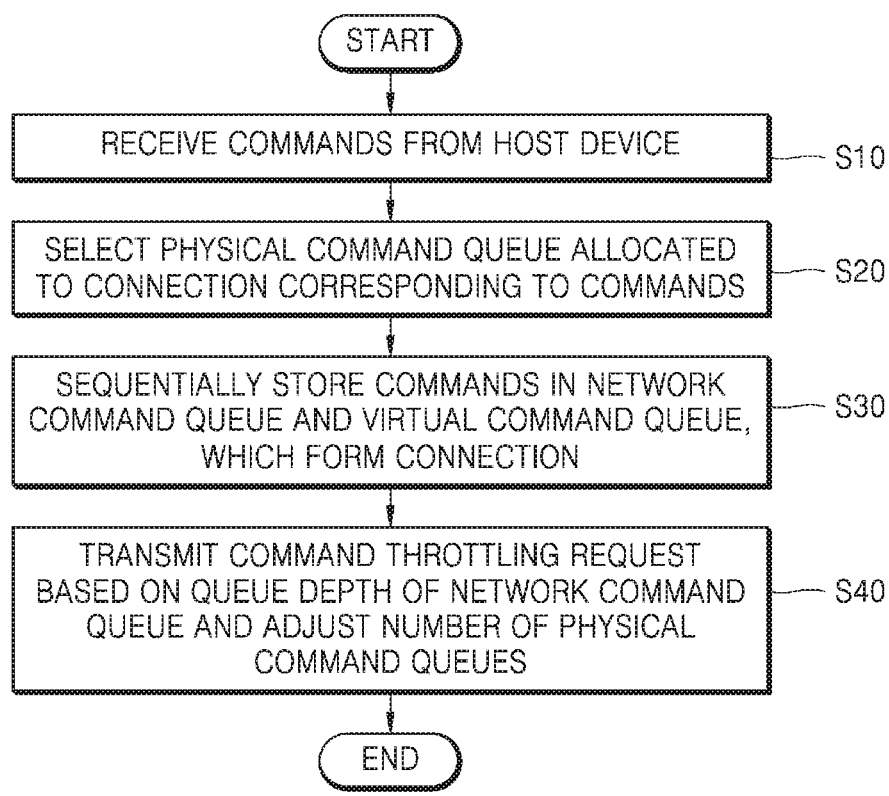
FIG. 2 is a flowchart of operations of a storage device of FIG. 1, according to an exemplary embodiment of the inventive concept.

FIG. 2 is a flowchart of operations of a storage device of FIG. 1, according to an exemplary embodiment of the inventive concept.

Referring to FIGS. 1 and 2, the storage device 10 may receive the commands CMDs from the host device 20 in operation S10. For example, the storage controller 100 may receive a packet including the commands CMDs and obtain the commands CMDs parsed from the packet.

The storage device 10 may select a physical command queue allocated to a connection corresponding to the commands CMDs in operation S20. The host device 20 may communicate with the storage device 10 through the connection. For example, the commands CMDs may correspond to one of a plurality of connections. The connection may include one network command queue and one virtual command queue, and a physical command queue allocated to the virtual command queue included in the connection may be selected.

For example, the storage device 10 may select a physical command queue, which receives the commands CMDs from a virtual command queue corresponding to the commands CMDs, from among the physical command queues 130. The storage device 10 may select one physical command queue or at least two physical command queues from the physical command queues 130. A physical command queue corresponding to the commands CMDs may be selected from available physical command queues having no other commands currently enqueued thereto among the physical command queues 130.

The storage device 10 may sequentially store the commands CMDs in the network command queue and the virtual command queue, which form the connection receiving the commands CMDs, in operation S30. For example, when the commands CMDs are received by the storage device 10, the commands CMDs may be stored in the network command queue at a certain speed and then fetched to the virtual command queue. In other words, when the commands CMDs are received by a certain connection of the storage device 10, the commands CMDs may be stored in a physical command queue, which is allocated to a virtual command queue, through a network command queue and the virtual command queue, which are included in the certain connection. The operation of storing some of the commands CMDs in the network command queue may be performed substantially in parallel with the operation of fetching others of the commands CMDs from the network command queue.

The storage device 10 may transmit the command throttling request CTR in response to the commands CMDs based on a queue depth of the network command queue corresponding to the commands CMDs in operation S40. In addition, the storage device 10 may adjust the number of physical command queues allocated to the virtual command queue, based on a queue depth of the virtual command queue corresponding to the commands CMDs, in operation S40.

In an exemplary embodiment of the inventive concept, a data processing method according to the commands CMDs may be changed according to a result of comparing the queue depth of the network command queue with the first reference value RV1 and a result of comparing the queue depth of the virtual command queue with the second reference value RV2. For example, when the queue depth of the virtual command queue exceeds the second reference value RV2, the storage device 10 may increase the number of memory chips to which the commands CMDs are allocated. In other words, when the queue depth of the virtual command queue exceeds the second reference value RV2, the storage device 10 may increase the number of physical command queues allocated to the virtual command queue of the connection receiving the commands CMDs.

When the queue depth of the network command queue exceeds the first reference value RV1, the storage device 10 may transmit the command throttling request CTR to the host device 20 as a response to the commands CMDs. Therefore, the storage device 10 may reduce data processing congestion and increase data processing performance by managing the queue depth of each of the network command queue and the virtual command queue not to exceed a reference value.

The first reference value RV1 may be set for the queue depth of each of the network command queues 110 and the second reference value RV2 may be set for the queue depth of each of the virtual command queues 120. In an exemplary embodiment of the inventive concept, the first reference value RV1 may be the same for all of the network command queues 110 and the second reference value RV2 may be the same for all of the virtual command queues 120. However, the inventive concept is not limited thereto. The first reference value RV1 for each of the network command queues 110 may be different among the network command queues 110, and the second reference value RV2 for each of the virtual command queues 120 may be different among the virtual command queues 120.

In an exemplary embodiment of the inventive concept, the first reference value RV1 and the second reference value RV2 may be preset. In an exemplary embodiment of the inventive concept, the first reference value RV1 and the second reference value RV2 may be set in a separate operation of setting the first reference value RV1 and the second reference value RV2. The operation of setting the first reference value RV1 and the second reference value RV2 will be described with reference to FIG. 12 below.

Figure 3:
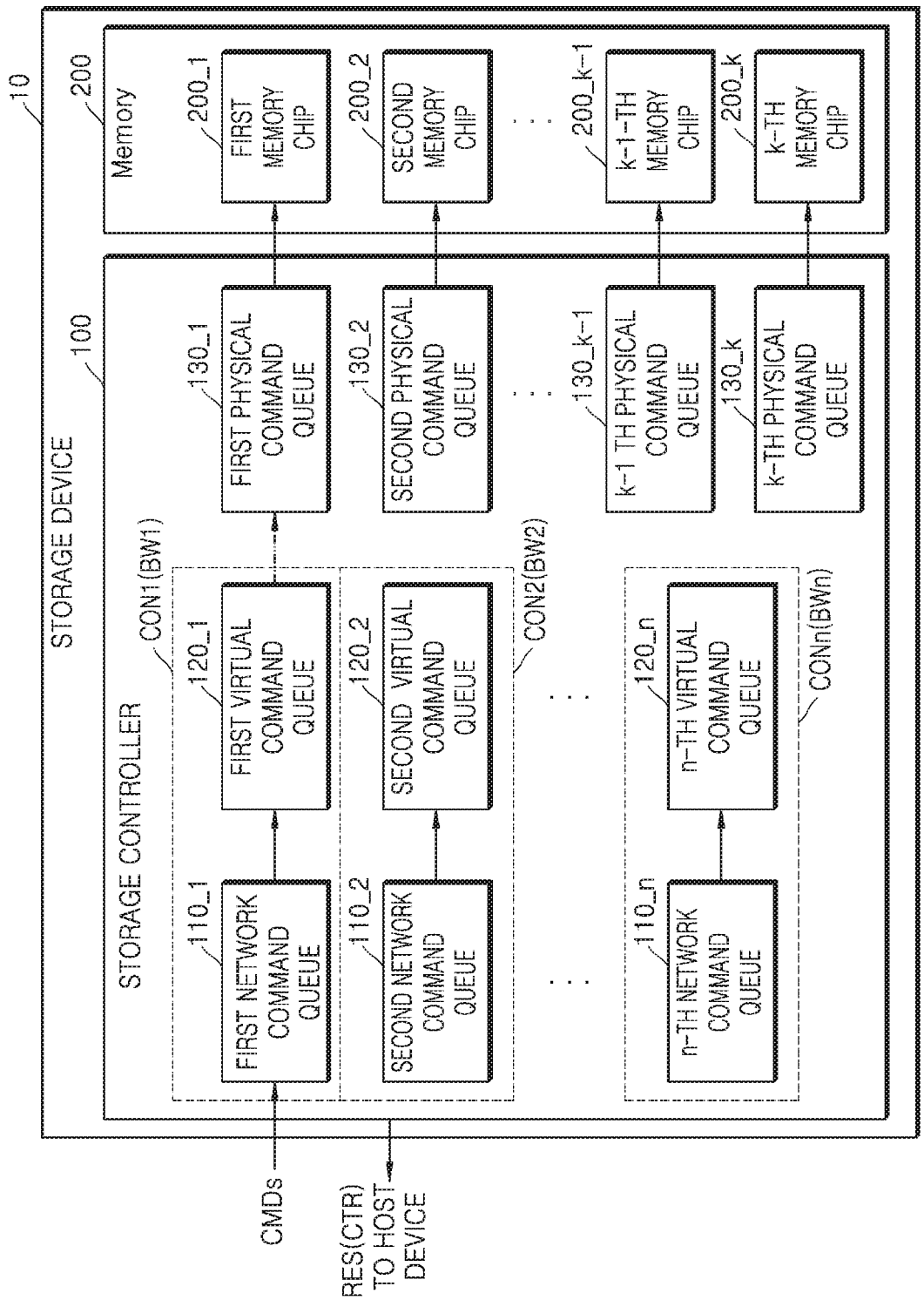
FIG. 3 is a block diagram of the storage device of FIG. 1 according to an exemplary embodiment of the inventive concept.

FIG. 3 is a block diagram of the storage device of FIG. 1 according to an exemplary embodiment of the inventive concept. Although the commands CMDs are received by a first connection CON1 in FIG. 1, the inventive concept is not limited thereto, and the same description may be applied to the case where the commands CMDs are received by second through n-th connections CON2 through CONn.

Referring to FIG. 3, the storage device 10 may include the storage controller 100 and the memory 200. The storage controller 100 may control all operations of the memory 200.

The storage controller 100 may include first through n-th network command queues 110_1 through 110_n, first through n-th virtual command queues 120_1 through 120_n, and first through k-th physical command queues 130_1 through 130_k. For example, "n" may be a natural number that is greater than or equal to 3, and "k" may be a natural number that is greater than or equal to 4. In an exemplary embodiment of the inventive concept, "n" may have the same value as "k". However, the inventive concept is not limited thereto, and "n" may have a different value than "k".

The storage controller 100 may include the first through n-th connections CON1 through CONn and communicate with a host device through each of the first through n-th connections CON1 through CONn. The first network command queue 110_1 and the first virtual command queue 120_1 may form the first connection CON1 and may be identified as the first connection CON1 by the host device (e.g., the host device 20 in FIG. 1). The second network command queue 110_2 and the second virtual command queue 120_2 may form the second connection CON2 and may be identified as the second connection CON2 by the host device 20. The n-th network command queue 110_n and the n-th virtual command queue 120_n may form the n-th connection CONn and may be identified as the n-th connection CONn by the host device 20. In other words, each of the first through n-th network command queues 110_1 through 110_n may correspond to one of the first through n-th virtual command queues 120_1 through 120_n.

In an exemplary embodiment of the inventive concept, each of the first through n-th connections CON1 through CONn may have an agreed bandwidth according to a service level agreement (SLA). For example, a first bandwidth BW1 may be agreed upon for the first connection CON1, a second bandwidth BW2 may be agreed upon for the second connection CON2, and an n-th bandwidth BWn may be agreed upon for the n-th connection CONn. In an exemplary embodiment of the inventive concept, the first through n-th bandwidths BW1 through BWn may have the same value as one another. However, the inventive concept is not limited thereto, and the first through n-th bandwidths BW1 through BWn may have different values.

The memory 200 may include first through k-th memory chips 200_1 through 200_k. Each of the first through k-th memory chips 200_1 through 200_k may correspond to one of the first through k-th physical command queues 130_1 through 130_k. For example, commands stored in the first physical command queue 130_1 may be transmitted to the first memory chip 200_1, commands stored in the second physical command queue 130_2 may be transmitted to the second memory chip 200_2, commands stored in the k-1-th physical command queue 130_k-1 may be transmitted to the k-1-th memory chip 200_k-1, and commands stored in the k-th physical command queue 130_k may be transmitted to the k-th memory chip 200_k.

The commands CMDs received by the first connection CON1 may be primarily stored in the first network command queue 110_1 temporarily. The first network command queue 110_1 may transmit commands stored therein, e.g., the commands CMDs, to the first virtual command queue 120_1. At this time, the operation of storing some of the commands CMDs in the first network command queue 110_1 may be performed substantially in parallel with the operation of fetching others of the commands CMDs from the first network command queue 110_1 to the first virtual command queue 120_1.

The first virtual command queue 120_1 may receive the commands CMDs from the first network command queue 110_1 and may temporarily store the commands CMDs. In an exemplary embodiment of the inventive concept, the first virtual command queue 120_1 may be connected to the first physical command queue 130_1, and the commands CMDs stored in the first virtual command queue 120_1 may be transmitted to and stored in the first physical command queue 130_1. At this time, the operation of storing some of the commands CMDs in the first virtual command queue 120_1 may be performed substantially in parallel with the operation of fetching others of the commands CMDs from the first virtual command queue 120_1 to the first physical command queue 130_1.

As the commands CMDs are stored in the first physical command queue 130_1, the first memory chip 200_1 may perform an operation according to the commands CMDs.

Although only the first physical command queue 130_1 is allocated to the first virtual command queue 120_1 in FIG. 3, the storage device 10 is not limited to the case where one physical command queue is allocated to one virtual command queue. For example, the first virtual command queue 120_1 may be connected to the first physical command queue 130_1 and the second physical command queue 130_2, which may alternately receive the commands CMDs from the first virtual command queue 120_1 and respectively store some and the others of the commands CMDs. In other words, the first physical command queue 130_1 may temporarily store and provide some of the commands CMDs to the first memory chip 200_1, and the second physical command queue 130_2 may temporarily store and provide the others of the commands CMDs to the second memory chip 200_2.

In an exemplary embodiment of the inventive concept, virtual command queues, e.g., the first virtual command queue 120_1 and the second virtual command queue 120_2, respectively included in different connections, may be connected to the first physical command queue 130_1. At this time, the first memory chip 200_1 may receive commands from both of the first virtual command queue 120_1 and the second virtual command queue 120_2. In other words, the first memory chip 200_1 may receive commands from both of the first connection CON1 and the second connection CON2.

The storage device 10 may transmit the command throttling request CTR to the host device 20 or increase the number of physical command queues (e.g., the first physical command queue 130_1 and the second physical command queue 130_2) allocated to the first virtual command queue 120_1, according to the operation of the first network command queue 110_1 receiving the commands CMDs, the operation of the first network command queue 110_1 transmitting the commands CMDs to the first virtual command queue 120_1, and the operation of the first virtual command queue 120_1 transmitting the commands CMDs to the first physical command queue 130_1. Accordingly, the storage device 10 may reduce data processing congestion and increase data processing performance.

Figure 4:
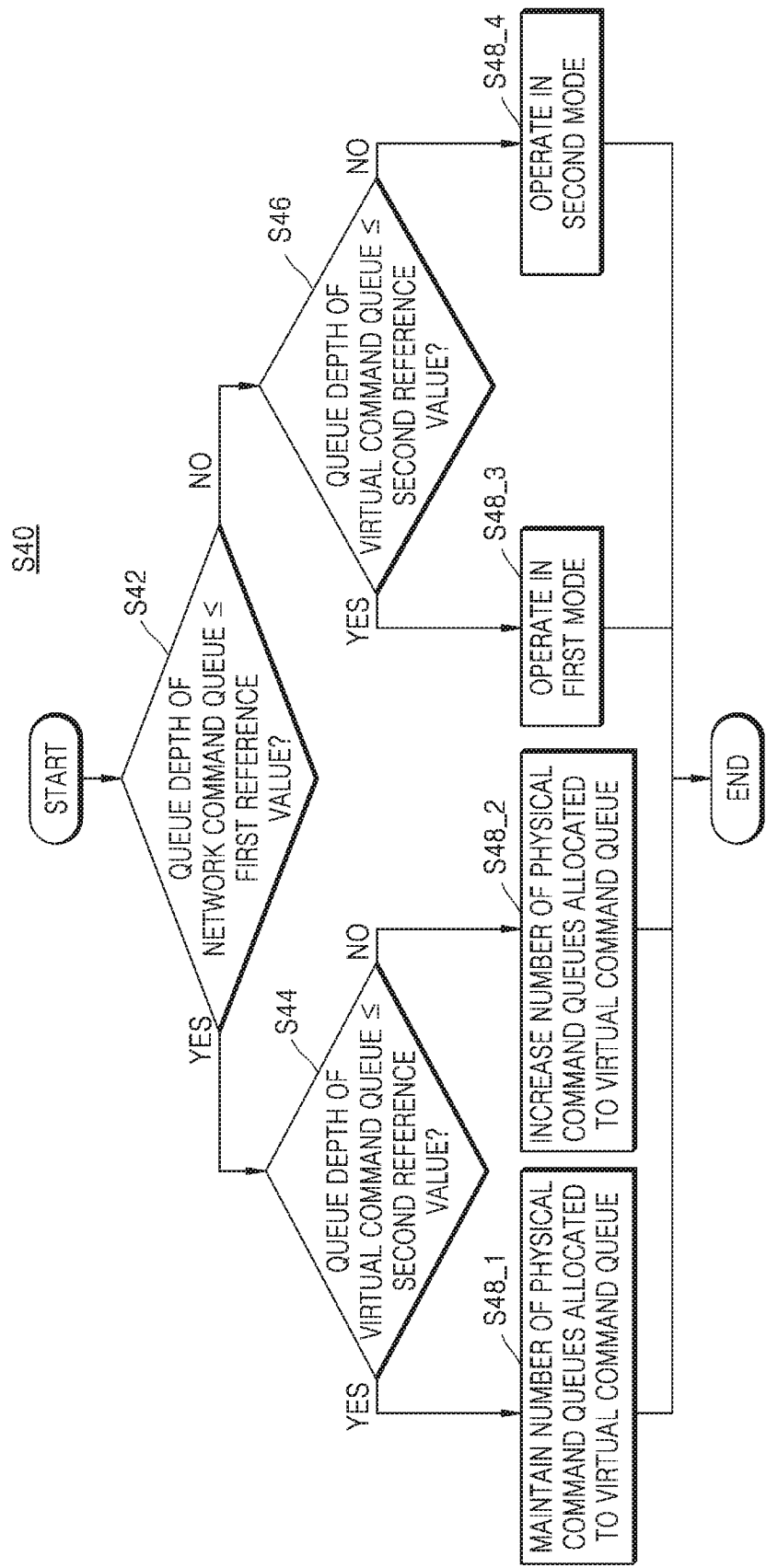
FIG. 4 is a flowchart of operations of a storage device, according to an exemplary embodiment of the inventive concept.
Figure 5:
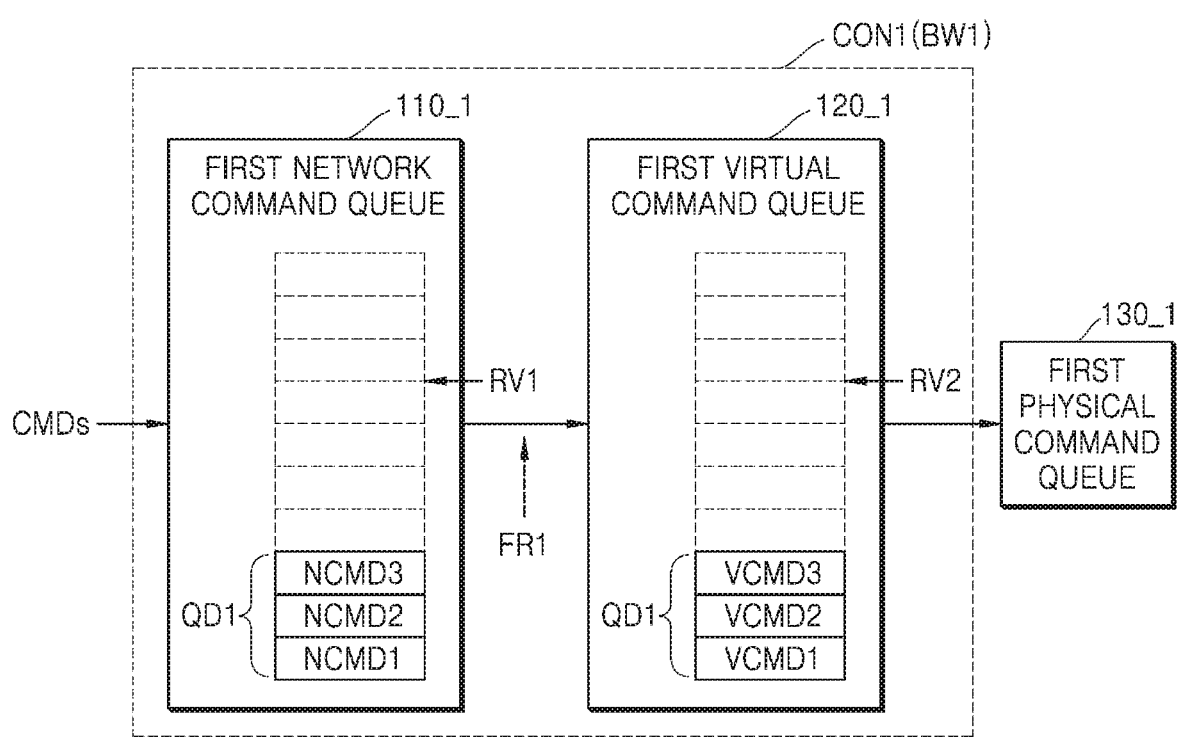
FIG. 5 is a diagram for describing operation S48_3 in FIG. 4 according to an exemplary embodiment of the inventive concept.
Figure 6:
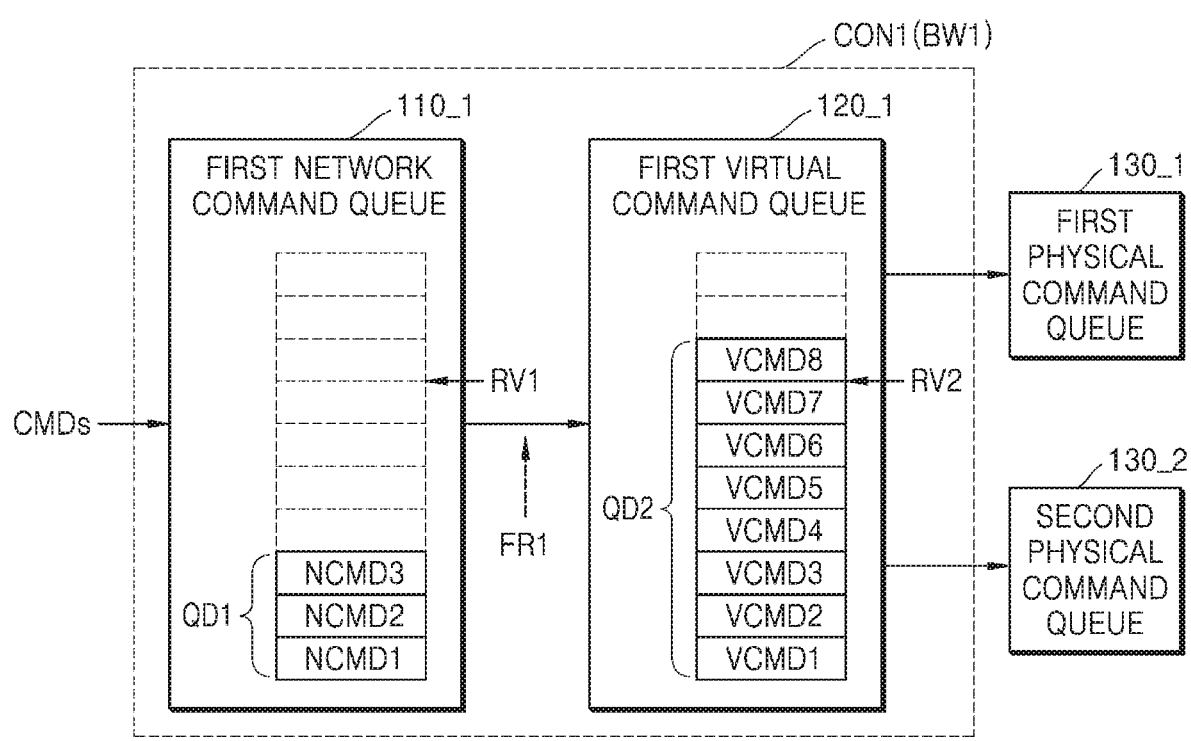
FIG. 6 is a diagram for describing operation S48_4 in FIG. 4 according to an exemplary embodiment of the inventive concept.

FIG. 4 is a flowchart of operations of a storage device, according to an exemplary embodiment of the inventive concept. In particular, FIG. 4 is a flowchart for describing operation S40 in FIG. 2. FIG. 5 is a diagram for describing operation S48_3 in FIG. 4 according to an exemplary embodiment of the inventive concept. FIG. 6 is a diagram for describing operation S48_4 in FIG. 4 according to an exemplary embodiment of the inventive concept. Operation S40 may include operations S42 through S48_4. For example, the commands CMDs may be received by the first connection CON1.

Referring to FIG. 4, a storage device may determine whether the queue depth of a network command queue is less than or equal to a first reference value in operation S42. The storage device may also determine whether the queue depth of a virtual command queue is less than or equal to a second reference value in operations S44 and S46. In an exemplary embodiment of the inventive concept, the first reference value and the second reference value may be preset and may be stored in the storage controller 100 in advance. In an exemplary embodiment of the inventive concept, the storage device may obtain the first reference value for the queue depth of the network command queue and the second reference value for the queue depth of the virtual command queue in operation S100 in FIG. 12 described below.

When the queue depth of the network command queue is less than or equal to the first reference value and the queue depth of the virtual command queue is less than or equal to the second reference value, operation S48_1 may be performed. The number of physical command queues allocated to the virtual command queue may be maintained in operation S48_1.

Referring to FIGS. 4 and 5, for example, the first reference value RV1 for the first network command queue 110_1 included in the first connection CON1 corresponding to the commands CMDs may be 7 and the second reference value RV2 for the first virtual command queue 120_1 may be 7. A queue depth QD1, e.g., the number of commands NCMD1 through NCMD3 enqueued to the first network command queue 110_1, may be 3. A queue depth QD2, e.g., the number of commands VCMD1 through VCMD3 enqueued to the first virtual command queue 120_1, may be 3.

When the queue depth QD1 of the first network command queue 110_1 is less than or equal to the first reference value RV1 and the queue depth QD2 of the first virtual command queue 120_1 is less than or equal to the second reference value RV2, the number of physical command queues, which are connected to the first virtual command queue 120_1 and receive the commands CMDs, is maintained in operation S48_1. In other words, the first physical command queue 130_1 selected in operation S20 in FIG. 2 is maintained as the physical command queue allocated to the first virtual command queue 120_1. At this time, the commands NCMD1 through NCMD3 enqueued to the first network command queue 110_1 may be fetched to the first virtual command queue 120_1 at a first fetching speed FR1.

Referring back to FIG. 4, when the queue depth of the network command queue is less than or equal to the first reference value and the queue depth of the virtual command queue exceeds the second reference value, operation S48_2 may be performed. The number of physical command queues allocated to the virtual command queue may be increased in operation S48_2.

Referring to FIGS. 4 and 6, for example, the first reference value RV1 and the second reference value RV2 may be 7. The queue depth QD1, e.g., the number of commands NCMD1 through NCMD3 enqueued to the first network command queue 110_1, may be 3. The queue depth QD2, e.g., the number of commands, e.g., first through eighth commands VCMD1 through VCMD8, enqueued to the first virtual command queue 120_1, may be 8.

When the queue depth QD1 of the first network command queue 110_1 is less than or equal to the first reference value RV1 and the queue depth QD2 of the first virtual command queue 120_1 exceeds the second reference value RV2, the number of physical command queues allocated to the first virtual command queue 120_1 may be increased from the number of physical command queues selected in operation S20 in FIG. 2, in operation S48_2. For example, the second physical command queue 130_2 may be further allocated to the first virtual command queue 120_1, and the first physical command queue 130_1 and the second physical command queue 130_2 may receive the commands CMDs from the first virtual command queue 120_1.

The first virtual command queue 120_1 may alternately transmit the first through eighth commands VCMD1 through VCMD8 to the first physical command queue 130_1 and the second physical command queue 130_2. For example, the first virtual command queue 120_1 may transmit the first command VCMD1 to the first physical command queue 130_1 and the second command VCMD2 to the second physical command queue 130_2. Accordingly, a speed at which the first through eighth commands VCMD1 through VCMD8 enqueued to the first virtual command queue 120_1 are output from the first virtual command queue 120_1 may be increased, and a speed at which the number of enqueued commands, e.g., the first through eighth commands VCMD1 through VCMD8, is reduced may also be increased.

Referring back to FIG. 4, when the queue depth of the network command queue exceeds the first reference value, a first mode or a second mode may be performed in operation S48_3 or S48_4, respectively. For example, when the queue depth of the virtual command queue is less than or equal to the second reference value, the first mode may be performed in operation S48_3. When the queue depth of the virtual command queue exceeds the second reference value, the second mode may be performed in operation S48_4. The first mode (e.g., operation S48_3) and the second mode (e.g., operation S48_4) will be described with reference to FIGS. 7 through 10 below.

Figure 7:
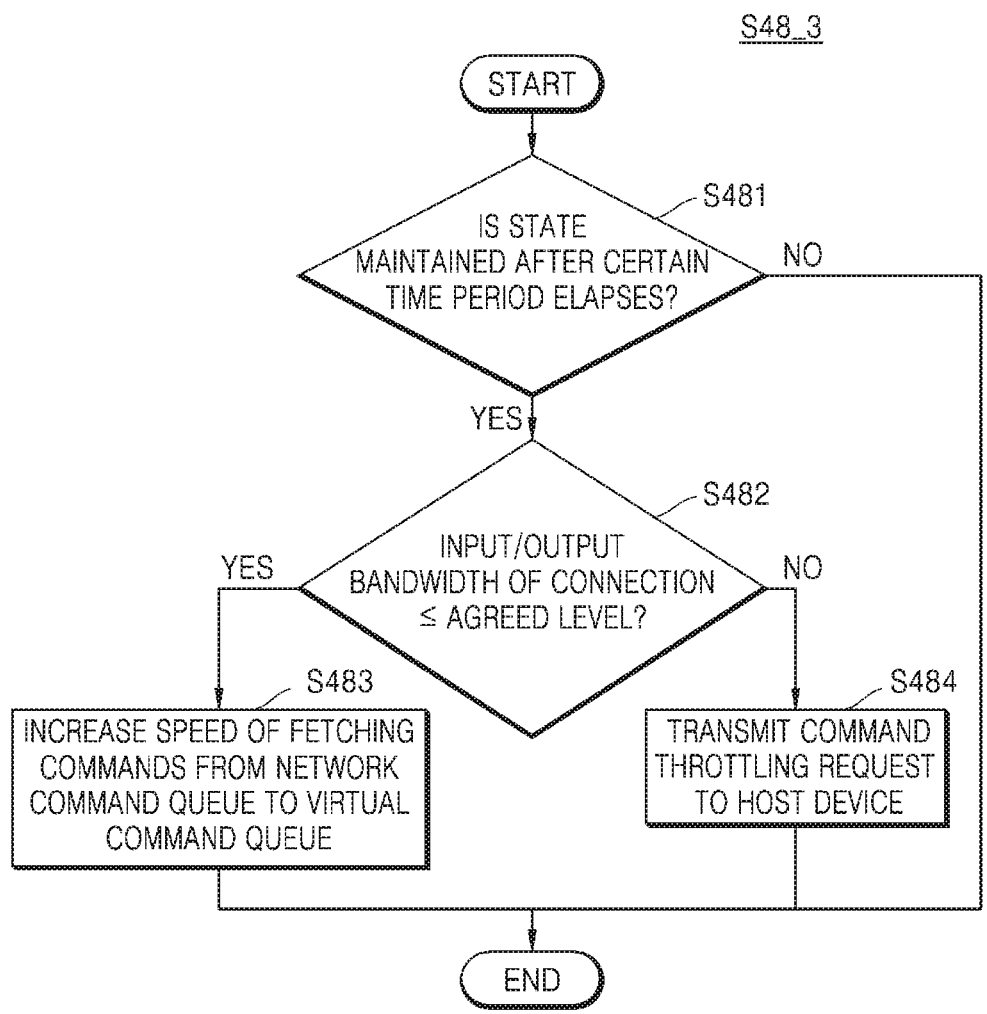
FIG. 7 is a flowchart of operations of a storage device, according to an exemplary embodiment of the inventive concept.
Figure 8:
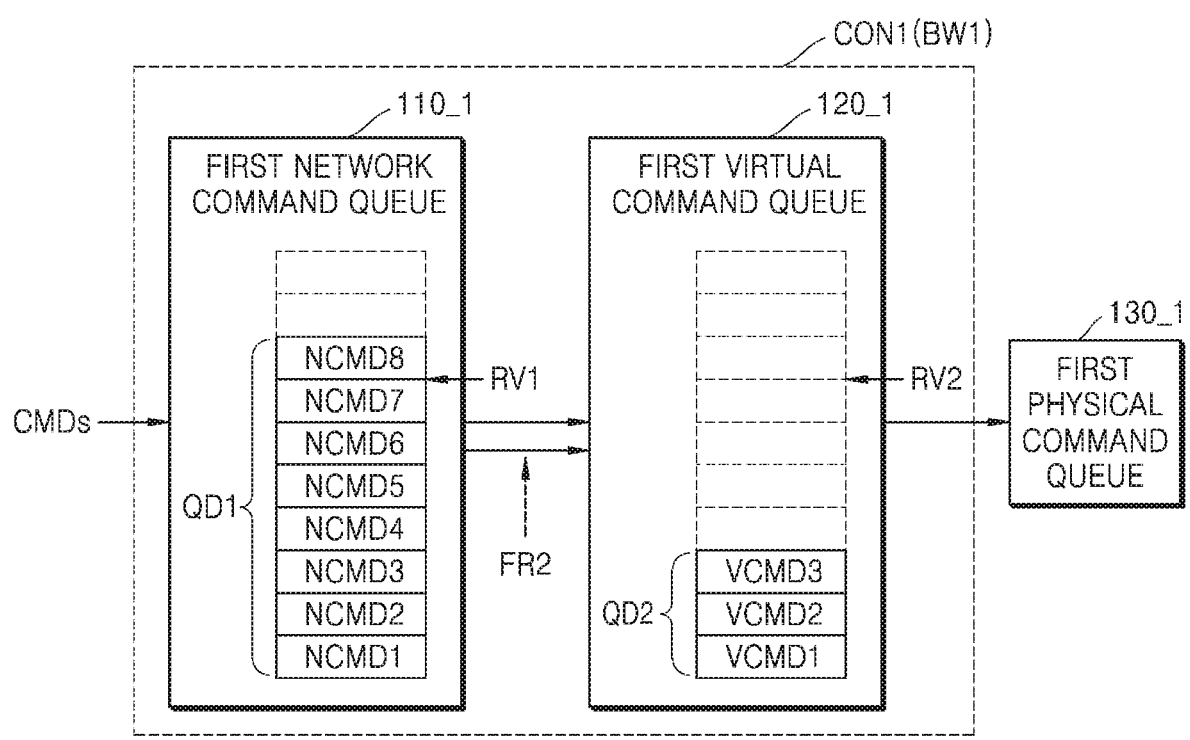
FIG. 8 is a diagram for describing operation S483 in FIG. 7 according to an exemplary embodiment of the inventive concept.

FIG. 7 is a flowchart of operations of a storage device, according to an exemplary embodiment of the inventive concept. In particular, FIG. 7 is a flowchart for describing operation S48_3 in FIG. 4. FIG. 8 is a diagram for describing operation S483 in FIG. 7 according to an exemplary embodiment of the inventive concept. Operation S48_3 may include operations S481 through S484.

Referring to FIGS. 7 and 8, when the queue depth of the network command queue exceeds the first reference value and the queue depth of the virtual command queue is less than or equal to the second reference value, operation S48_3 may be performed. For example, the first reference value RV1 for the first network command queue 110_1 and the second reference value RV2 for the first virtual command queue 120_1 may be 7. The queue depth QD1, e.g., the number of commands NCMD1 through NCMD8 enqueued to the first network command queue 110_1, may be 8. The queue depth QD2, e.g., the number of commands VCMD1 through VCMD3 enqueued to the first virtual command queue 120_1, may be 3.

The storage device may identify whether the queue depth of the network command queue exceeds the first reference value and whether the queue depth of the virtual command queue is less than or equal to the second reference value even after a certain time period elapses, in operation S481. For example, when the commands CMDs from a host device are received by the first connection CON1 of the storage device, the queue depth QD1 of the first network command queue 110_1 may be rapidly increased and then may be gradually decreased over time. Therefore, a state where the queue depth QD1 of the first network command queue 110_1 exceeds the first reference value RV1 and the queue depth QD2 of the first virtual command queue 120_1 is less than or equal to the second reference value RV2 even after a certain time period elapses may be identified.

When the above described state is maintained, the storage device may identify whether an input/output bandwidth of the connection including the network command queue and the virtual command queue is less than or equal to an agreed level in operation S482. For example, the storage device may identify whether an input/output bandwidth of the first connection CON1 is less than or equal to an agreed level, e.g., the first bandwidth BW1. The agreed level may be a predetermined level.

When the input/output bandwidth of the connection is less than or equal to the agreed level, the storage device may increase a fetching speed, at which commands enqueued to the network command queue are output to the virtual command queue, in operation S483. When the queue depth of the network command queue exceeds the first reference value even though the input/output bandwidth of the connection is less than or equal to the agreed level, the storage device may determine that a speed of outputting commands from the network command queue is low and may increase the fetching speed, at which commands enqueued to the network command queue are output to the virtual command queue. For example, when the input/output bandwidth of the first connection CON1 is less than or equal to the agreed level, e.g., the first bandwidth BW1, the commands NCMD1 through NCMD8 enqueued to the first network command queue 110_1 may be fetched to the first virtual command queue 120_1 at a second fetching speed FR2, which is higher than the first fetching speed (e.g., FR1 in FIG. 5).

When the input/output bandwidth of the connection exceeds the agreed level, the storage device may transmit a command throttling request (e.g., the command throttling request CTR in FIG. 3) to the host device in operation S484. At this time, the command throttling request CTR may be transmitted as a response to the commands (e.g., CMDs). The command throttling request CTR may include information about a bandwidth violation. Accordingly, the host device may decrease the bandwidth of commands, which are transmitted to the storage device, according to the command throttling request CTR, and may keep the agreed level of bandwidth.

Figure 9:
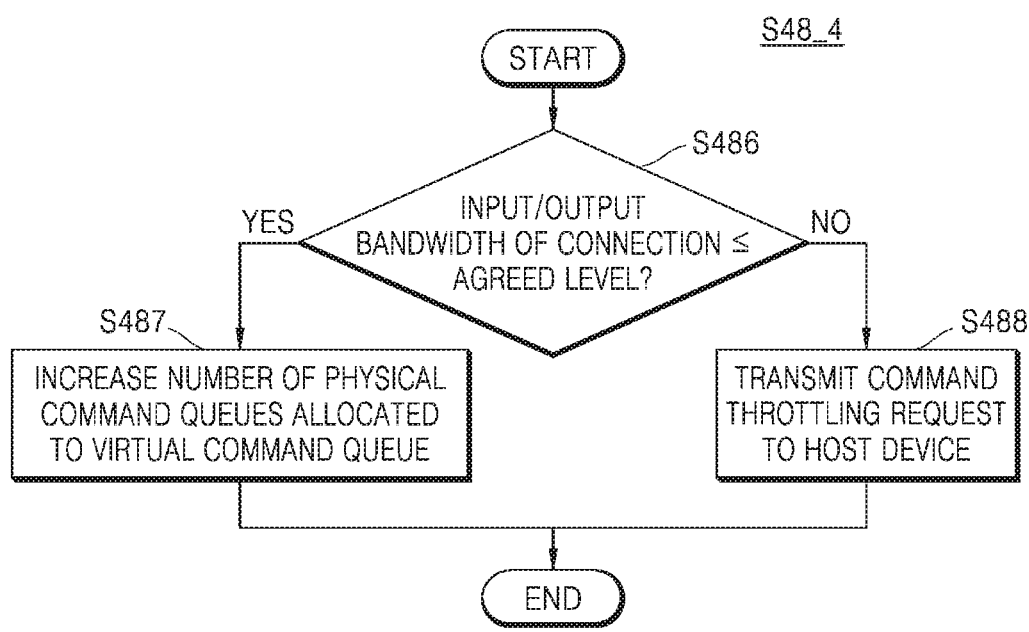
FIG. 9 is a flowchart of operations of a storage device, according to an exemplary embodiment of the inventive concept.
Figure 10:
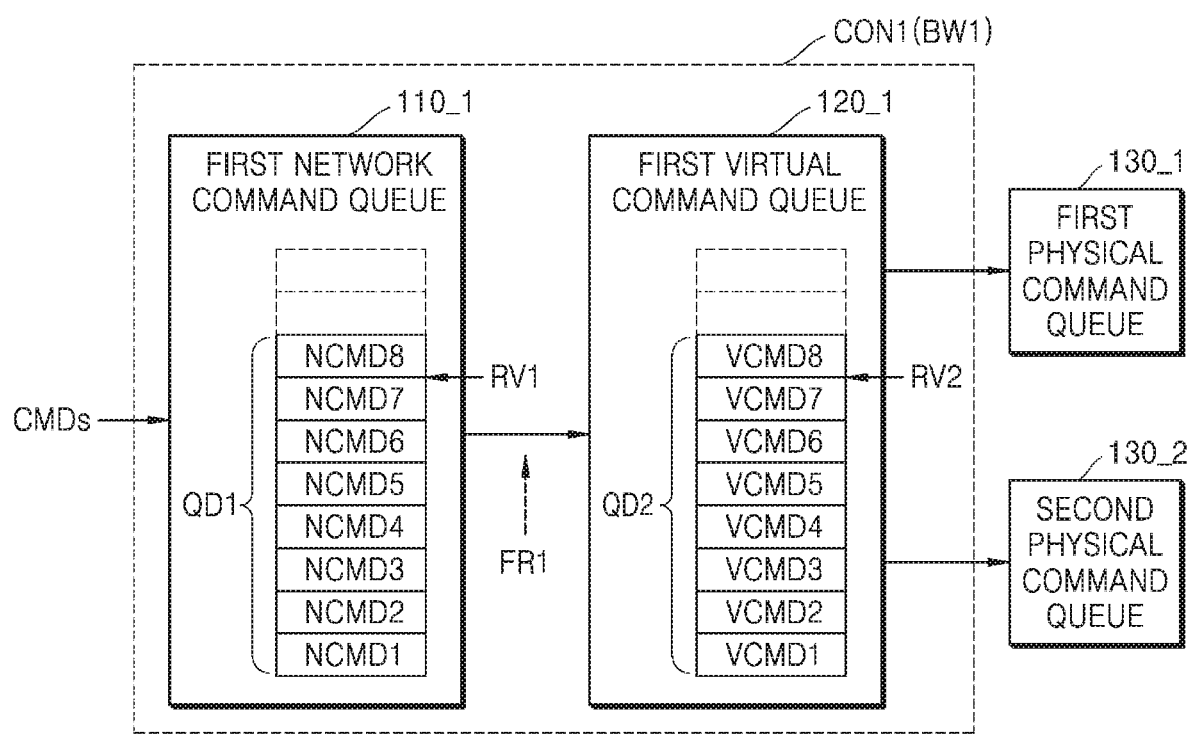
FIG. 10 is a diagram for describing operation S487 in FIG. 9 according to an exemplary embodiment of the inventive concept.

FIG. 9 is a flowchart of operations of a storage device, according to an exemplary embodiment of the inventive concept. In particular, FIG. 9 is a flowchart for describing operation S48_4 in FIG. 4. FIG. 10 is a diagram for describing operation S487 in FIG. 9 according to an exemplary embodiment of the inventive concept. Operation S48_4 may include operations S486 through S488.

Referring to FIGS. 9 and 10, when the queue depth of the network command queue exceeds the first reference value and the queue depth of the virtual command queue exceeds the second reference value, operation S48_4 may be performed. For example, the first reference value RV1 and the second reference value RV2 may be 7. The queue depth QD1, e.g., the number of commands NCMD1 through NCMD8 enqueued to the first network command queue 110_1, may be 8. The queue depth QD2, e.g., the number of commands VCMD1 through VCMD8 enqueued to the first virtual command queue 120_1, may be 8.

The storage device may identify whether an input/output bandwidth of the connection including the network command queue and the virtual command queue is less than or equal to an agreed level in operation S486. For example, the storage device may identify whether an input/output bandwidth of the first connection CON1 is less than or equal to an agreed level, e.g., the first bandwidth BW1.

When the input/output bandwidth of the connection is less than or equal to the agreed level, the storage device may increase the number of physical command queues allocated to the virtual command queue in operation S487. For example, when the input/output bandwidth of the first connection CON1 is less than or equal to the first bandwidth BW1, the storage device may connect the first physical command queue 130_1 and the second physical command queue 130_2 to the first virtual command queue 120_1, thus increasing the number of physical command queues allocated to the first virtual command queue 120_1 and the number of memory chips (e.g., a first memory chip and a second memory chip) processing the commands CMDs. When the queue depth QD1 of the first network command queue 110_1 exceeds the first reference value RV1 and the queue depth QD2 of the first virtual command queue 120_1 exceeds the second reference value RV2 even though the input/output bandwidth of the first connection CON1 does not exceed the first bandwidth BW1, it may be determined that a speed of outputting the commands VCMD1 through VCMD8 enqueued to the first virtual command queue 120_1 is low. Therefore, the storage device may increase the speed of outputting the commands VCMD1 through VCMD8 enqueued to the first virtual command queue 120_1 by increasing the number of physical command queues allocated to the first virtual command queue 120_1.

When the input/output bandwidth of the connection exceeds the agreed level, the storage device may transmit a command throttling request (e.g., the command throttling request CTR in FIG. 3) to the host device in operation S488. At this time, the command throttling request CTR may be transmitted as a response to the commands (e.g., CMDs). The command throttling request CTR may include information about a bandwidth violation. Accordingly, the host device may decrease the bandwidth of commands, which are transmitted to the storage device, according to the command throttling request CTR, and may keep the agreed level of bandwidth.

Figure 11:
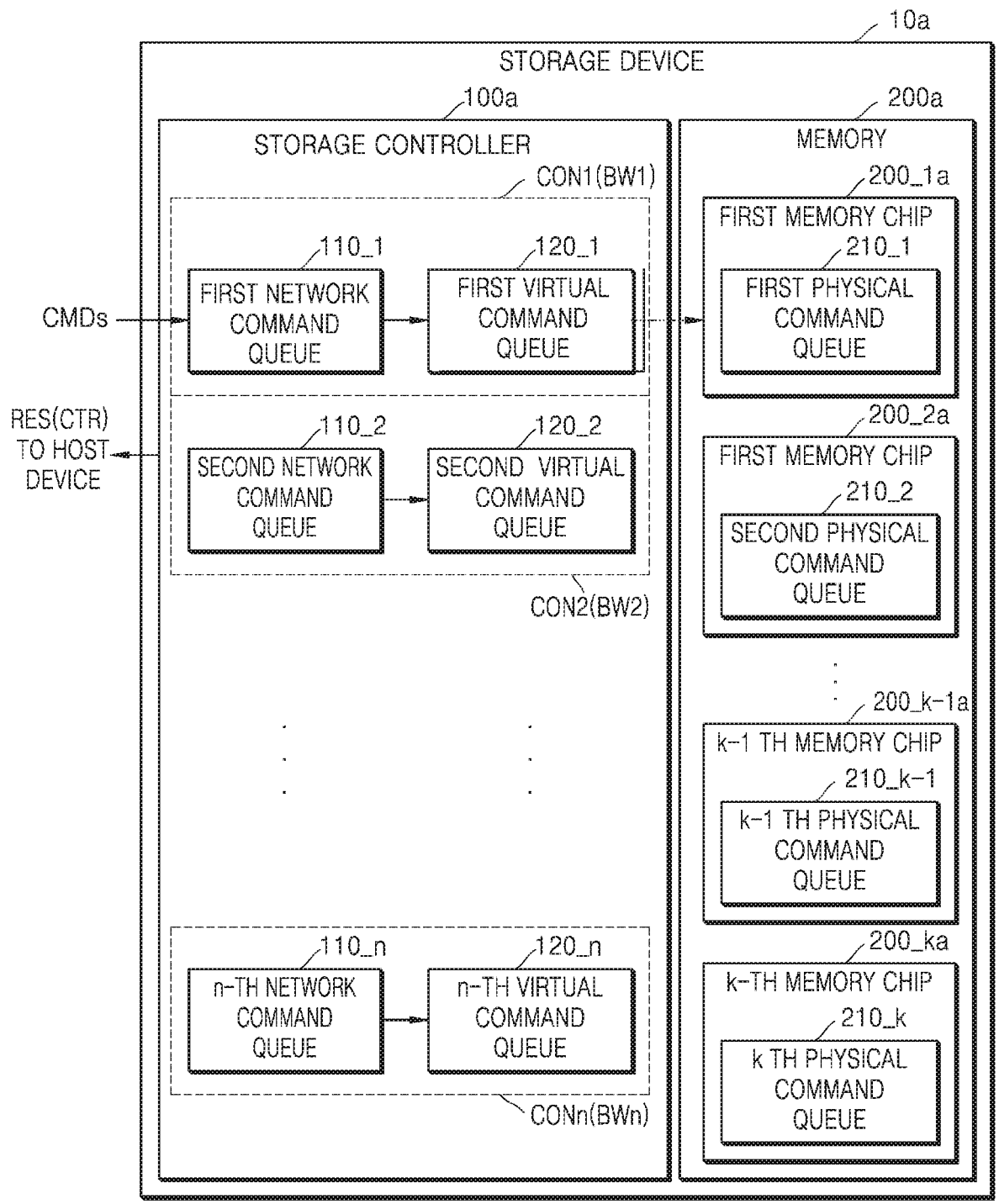
FIG. 11 is a block diagram of a storage device according to an exemplary embodiment of the inventive concept.

FIG. 11 is a block diagram of a storage device according to an exemplary embodiment of the inventive concept. Redundant descriptions of like reference numerals in FIGS. 3 and 11 will be omitted.

Referring to FIG. 11, a storage device 10a may include a storage controller 100a and a memory 200a. The storage controller 100a may control all operations of the memory 200a.

The storage controller 100a may include the first through n-th network command queues 110_1 through 110_n and the first through n-th virtual command queues 120_1 through 120_n. For example, "n" may be a natural number that is greater than or equal to 3.

The memory 200a may include first through k-th memory chips 200_1a through 200_ka. Each of the first through k-th memory chips 200_1a through 200_ka may include a corresponding one of first through k-th physical command queues 210_1 through 210_k. Each of the first through k-th memory chips 200_1a through 200_ka may perform an operation according to a command stored in a corresponding physical command queue. For example, the first memory chip 200_1a may include the first physical command queue 210_1, the second memory chip 200_2a may include the second physical command queue 210_2, the k−1-th memory chip 200_k−1a may include the k−1-th physical command queue 210_k−1, and the k-th memory chip 200_ka may include the k-th physical command queue 210_k. For example, "k" may be a natural number that is greater than or equal to 4. In an exemplary embodiment of the inventive concept, "n" may have the same value as "k". However, the inventive concept is not limited thereto, and "n" may have a different value than "k".

In an exemplary embodiment of the inventive concept, the commands CMDs may be received by the first connection CON1 and may be temporarily stored in the first network command queue 110_1. The first network command queue 110_1 may transmit the commands CMDs to the first virtual command queue 120_1, and the first virtual command queue 120_1 may temporarily store the commands CMDs. In an exemplary embodiment of the inventive concept, the first virtual command queue 120_1 may be connected to the first physical command queue 210_1, and the commands CMDs stored in the first virtual command queue 120_1 may be transmitted to the first physical command queue 210_1. Accordingly, the first memory chip 200_1a may perform an operation according to the commands CMDs.

The storage device 10a may transmit the command throttling request CTR to the host device 20 or change the number of physical command queues allocated to the first virtual command queue 120_1, according to the operation of the first network command queue 110_1 receiving the commands CMDs, the operation of the first network command queue 110_1 transmitting the commands CMDs to the first virtual command queue 120_1, and the operation of the first virtual command queue 120_1 transmitting the commands CMDs to the first physical command queue 210_1. In an exemplary embodiment of the inventive concept, the storage device 10a may transmit the command throttling request CTR to the host device 20 or change the number of physical command queues allocated to the first virtual command queue 120_1 based on a result of comparing a queue depth of the first network command queue 110_1 with a first reference value and a result of comparing a queue depth of the first virtual command queue 120_1 with a second reference value.

The descriptions of FIG. 2 and FIGS. 4 through 9 may be applied to the storage device 10a. In this case, as the first through k-th memory chips 200_1a through 200_ka each include a corresponding one of first through k-th physical command queues 210_1 through 210_k, a number of memory chips (among 200_1a through 200_ka) provided with the command enqueued to the virtual command queue (e.g., the first virtual command queue 120_1) may be adjusted based on the queue depth of the virtual command queue. Accordingly, the storage device 10a may reduce data processing congestion and increase data processing performance.

Figure 12:
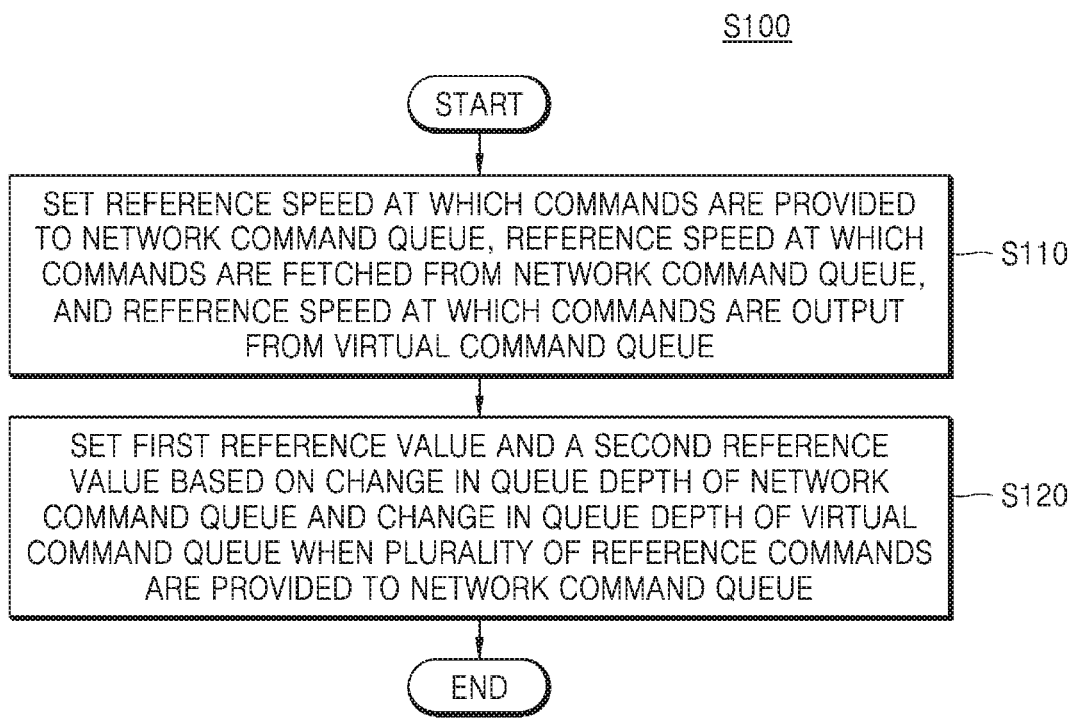
FIG. 12 is a block diagram for describing operations of a storage device, according to an exemplary embodiment of the inventive concept.
Figures 13A, 13B:
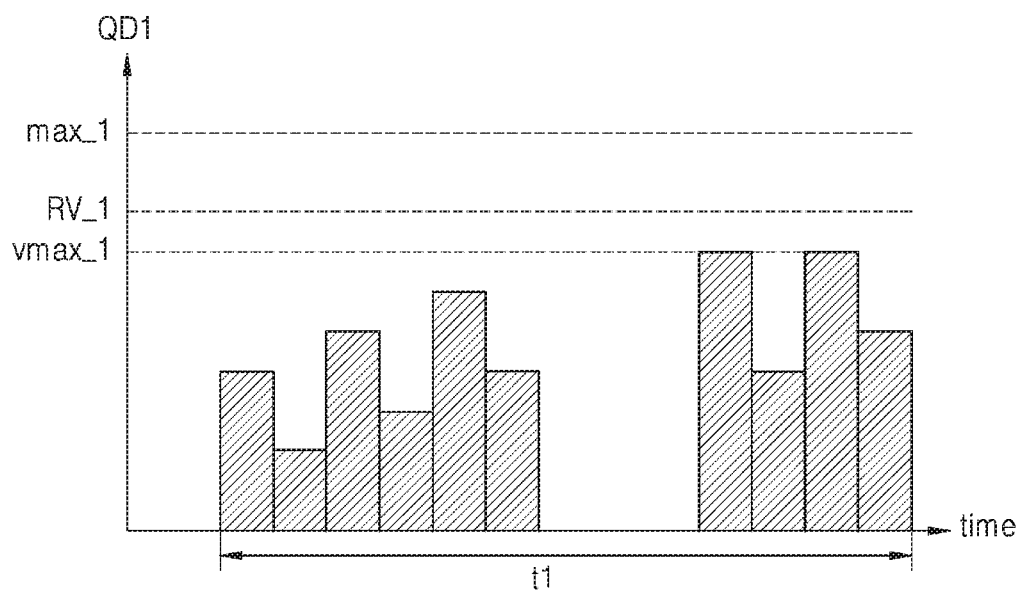
FIGS. 13A and 13B are diagrams for describing operation S120 in FIG. 12 according to an exemplary embodiment of the inventive concept.

FIG. 12 is a block diagram for describing operations of a storage device, according to an exemplary embodiment of the inventive concept. FIGS. 13A and 13B are diagrams for describing operation S120 in FIG. 12 according to an exemplary embodiment of the inventive concept. In an exemplary embodiment of the inventive concept, a first reference value and a second reference value for a network command queue and a virtual command queue, respectively, which form a single connection, are set in operation S100 in FIG. 12. Operation S100 may be performed before operation S10 in FIG. 2, but the inventive concept is not limited thereto. Operation S100 may include operations S110 and S120.

Referring to FIG. 12, the storage device may set reference speeds including a reference speed at which commands are provided to the network command queue, a reference speed at which commands are fetched from the network command queue, and a reference speed at which commands are output from the virtual command queue, in operation S110. The reference speeds may have certain values to set the first reference value and the second reference value. For example, assuming that one physical command queue is allocated to the virtual command queue, the reference speed at which commands are provided to the network command queue, the reference speed at which commands are fetched from the network command queue, and the reference speed at which commands are output from the virtual command queue may be set. However, the inventive concept is not limited thereto. The reference speed at which commands are provided to the network command queue, the reference speed at which commands are fetched from the network command queue, and the reference speed at which commands are output from the virtual command queue may be set assuming that a plurality of physical command queues are allocated to the virtual command queue.

When a plurality of reference commands are provided to the network command queue, the storage device may set the first reference value for the network command queue and the second reference value for the virtual command queue based on a change in the queue depth of the network command queue and a change in the queue depth of the virtual command queue according to the set reference speeds in operation S120.

Referring to FIGS. 12 through 13B, the queue depth QD1 of the network command queue may be repeatedly increased and decreased while the network command queue is receiving reference commands and outputting the reference commands to the virtual command queue. The storage device may detect a change in the queue depth QD1 of the network command queue during a first time period t1 in operation S120. The storage device may set a first reference value RV_1 to be greater than a maximum value vmax_1 of the queue depth QD1 and less than a queue capacity max_1 of the network command queue. The queue capacity max_1 of the network command queue may refer to the maximum number of commands that may be stored in the network command queue.

The queue depth QD2 of the virtual command queue may be repeatedly increased and decreased while the virtual command queue is receiving reference commands and outputting the reference commands to a physical command queue. The storage device may detect a change in the queue depth QD2 of the virtual command queue during a second time period t2 in operation S120. The storage device may set a second reference value RV_2 to be greater than a maximum value vmax_2 of the queue depth QD2 and less than a queue capacity max_2 of the virtual command queue. The queue capacity max_2 of the virtual command queue may refer to the maximum number of commands that may be stored in the virtual command queue.

Referring to FIGS. 3, 11, and 12, first reference values for the first through n-th network command queues 110_1 through 110_n may be the same as one another. For example, after a first reference value is set for the first connection CON1 in operation S100, the set first reference value may be applied to the second through n-th network command queues 110_2 through 110_n. Alternatively, a first reference value may be set for each of the first through n-th connections CON1 through CONn in operation S100 such that first reference values are respectively set for the first through n-th network command queues 110_1 through 110_n, and some of the first reference values may be different from one another.

In an exemplary embodiment of the inventive concept, second reference values for the first through n-th virtual command queues 120_1 through 120_n in FIGS. 3 and 11 may be the same as one another. For example, after a second reference value is set for the first connection CON1 in operation S100, the set second reference value may be applied to the second through n-th virtual command queues 120_2 through 120_n. Alternatively, a second reference value may be set for each of the first through n-th connections CON1 through CONn in operation S100 such that second reference values are respectively set for the first through n-th virtual command queues 120_1 through 120_n, and some of the second reference values may be different from one another.

For example, a reference speed, at which commands are output from a virtual command queue when one physical command queue is allocated to the virtual command queue, may be lower than a reference speed, at which commands are output from a virtual command queue when a plurality of physical command queues are allocated to the virtual command queue. Accordingly, a first reference value and a second reference value when one physical command queue is allocated to a virtual command queue may be different from a first reference value and a second reference value when a plurality of physical command queues are allocated to a virtual command queue. For example, assuming that the first virtual command queue 120_1 is connected to the first physical command queue 130_1 (or 210_1) and the n-th virtual command queue 120_n is connected to the k−1-th physical command queue 130_k−1 or (210_k−1) and the k-th physical command queue 130_k or (210_k) in operation S110, a first reference value set for the first network command queue 110_1 in operation S120 may be different from a first reference value set for the n-th network command queue 110_n in operation S120, and a second reference value set for the first virtual command queue 120_1 in operation S120 may be different from a second reference value set for the n-th virtual command queue 120_n in operation S120.

While the inventive concept has been particularly shown and described with reference to exemplary embodiments thereof, it will be understood by those of ordinary skill in the art that various changes in form and details may be made thereto without departing from the spirit and scope of the inventive concept as set forth by the following claims.

What is claimed is:

1. An operating method of a storage device including a plurality of memory chips and a connection including a network command queue and a virtual command queue, the operating method comprising:
   receiving a plurality of commands from a host device using the connection;
   selecting a physical command queue allocated to the connection among a plurality of physical command queues corresponding to the plurality of memory chips;
   sequentially storing the plurality of commands in the network command queue and the virtual command queue; and
   transmitting a command throttling request to the host device in response to the plurality of commands based on a queue depth of the network command queue and adjusting a number of physical command queues allocated to the connection based on a queue depth of the virtual command queue.

2. The operating method of claim 1, wherein the transmitting of the command throttling request and the adjusting of the number of physical command queues includes maintaining the number of physical command queues allocated to the connection, when the queue depth of the network command queue is less than or equal to a first reference value and the queue depth of the virtual command queue is less than or equal to a second reference value.

3. The operating method of claim 1, wherein the transmitting of the command throttling request and the adjusting of the number of physical command queues includes increasing the number of physical command queues allocated to the connection, when the queue depth of the network command queue is less than or equal to a first reference value and the queue depth of the virtual command queue exceeds a second reference value.

4. The operating method of claim 1, wherein the transmitting of the command throttling request and the adjusting of the number of physical command queues includes:
   determining whether an input/output bandwidth of the connection is less than or equal to a predetermined level, when the queue depth of the network command queue exceeds a first reference value and the queue depth of the virtual command queue is less than or equal to a second reference value; and
   increasing a command fetching speed at which the plurality of commands are fetched from the network command queue to the virtual command queue, when the input/output bandwidth of the connection is less than or equal to the predetermined level.

5. The operating method of claim 1, wherein the transmitting of the command throttling request and the adjusting of the number of physical command queues includes:
   determining whether an input/output bandwidth of the connection is less than or equal to a predetermined level, when the queue depth of the network command queue exceeds a first reference value and the queue depth of the virtual command queue is less than or equal to a second reference value; and
   transmitting the command throttling request to the host device when the input/output bandwidth exceeds the predetermined level, wherein the command throttling request includes information about a violation of the input/output bandwidth.

6. The operating method of claim 5, wherein the transmitting of the command throttling request and the adjusting of the number of physical command queues further includes, before the determining of whether the input/output bandwidth of the connection is less than or equal to the predetermined level, determining whether, after a certain time period elapses, the queue depth of the network command queue exceeds the first reference value and the queue depth of the virtual command queue is less than or equal to the second reference value.

7. The operating method of claim 1, wherein the transmitting of the command throttling request and the adjusting of the number of physical command queues includes:
determining whether an input/output bandwidth of the connection is less than or equal to a predetermined level, when the queue depth of the network command queue exceeds a first reference value and the queue depth of the virtual command queue exceeds a second reference value; and
increasing the number of physical command queues allocated to the connection, when the input/output bandwidth is less than or equal to the predetermined level.

8. The operating method of claim 1, wherein the transmitting of the command throttling request and the adjusting of the number of physical command queues includes:
determining whether an input/output bandwidth of the connection is less than or equal to a predetermined level, when the queue depth of the network command queue exceeds a first reference value and the queue depth of the virtual command queue exceeds a second reference value; and
transmitting the command throttling request to the host device when the input/output bandwidth exceeds the predetermined level, wherein the command throttling request includes information about a violation of the input/output bandwidth.

9. The operating method of claim 1, further comprising, before the receiving of the plurality of commands from the host device using the connection, setting a first reference value of the queue depth of the network command queue and a second reference value of the queue depth of the virtual command queue,
wherein the setting of the first reference value and the second reference value includes:
setting reference speeds including a reference speed at which commands are provided to the network command queue, a reference speed at which commands are fetched from the network command queue to the virtual command queue, and a reference speed at which commands are output from the virtual command queue; and
setting the first reference value and the second reference value based on a change in the queue depth of the network command queue and a change in the queue depth of the virtual command queue according to the set reference speeds when a plurality of reference commands are provided to the network command queue.

10. The operating method of claim 9, wherein the setting of the first reference value and the second reference value includes:
setting, as the first reference value, a value between a maximum value of the queue depth of the network command queue during a first time period and a queue capacity of the network command queue; and
setting, as the second reference value, a value between a maximum value of the queue depth of the virtual command queue during a second time period and a queue capacity of the virtual command queue.

11. A storage device configured to interface with a host device, the storage device comprising:
a memory including a plurality of memory chips; and
a storage controller configured to control operations of the memory,
wherein the storage controller includes:
a plurality of connections including a network command queue and a virtual command queue and configured to receive a command from the host device; and
a plurality of physical command queues respectively connected to the plurality of memory chips and each configured to provide the command to a corresponding one of the plurality of memory chips, and
the storage controller is configured to transmit a command throttling request to the host device based on a queue depth of the network command queue and to adjust a number of physical command queues connected to the virtual command queue based on a queue depth of the virtual command queue.

12. The storage device of claim 11, wherein the storage device includes an Ethernet-attached storage drive (EASD).

13. The storage device of claim 11, wherein the storage controller is further configured to increase the number of physical command queues connected to the virtual command queue, when the queue depth of the network command queue is less than or equal to a first reference value and the queue depth of the virtual command queue exceeds a second reference value.

14. The storage device of claim 11, wherein the storage controller is further configured to increase a speed of fetching the command from the network command queue to the virtual command queue, when the queue depth of the network command queue exceeds a first reference value, the queue depth of the virtual command queue is less than or equal to a second reference value, and an input/output bandwidth of a connection including the network command queue and the virtual command queue is less than or equal to a predetermined level.

15. A storage device comprising:
a memory including a plurality of memory chips; and
a storage controller configured to control operations of the memory,
wherein the storage controller includes a plurality of connections including a network command queue and a virtual command queue and configured to receive a command from a host device, and
the storage controller is configured to transmit a command throttling request to the host device based on a queue depth of the network command queue, and to adjust, based on a queue depth of the virtual command queue, a number of memory chips provided with the command enqueued to the virtual command queue.

16. The storage device of claim 15, wherein each of the plurality of memory chips includes a physical command queue, and
the storage controller adjusts the number of memory chips provided with the command enqueued to the virtual command queue by adjusting, based on the queue depth of the virtual command queue, a number of physical command queues allocated to the virtual command queue.

17. The storage device of claim 15, wherein the storage controller is further configured to transmit the command throttling request to the host device when the queue depth of the network command queue exceeds a first reference value and the input/output bandwidth exceeds a predetermined level, and
the command throttling request includes information about a violation of an input/output bandwidth of a connection including the network command queue.

18. The storage device of claim 15, wherein the storage controller is further configured to increase the number of memory chips provided with the command enqueued to the virtual command queue, when the queue depth of the network command queue is less than or equal to a first reference value and the queue depth of the virtual command queue exceeds a second reference value.

19. The storage device of claim 15, wherein the storage controller is further configured to increase a speed of fetching the command from the network command queue to the virtual command queue, when the queue depth of the network command queue exceeds a first reference value, the queue depth of the virtual command queue is less than or equal to a second reference value, and an input/output bandwidth of a connection including the network command queue and the virtual command queue is less than or equal to a predetermined level.

20. The storage device of claim 15, wherein the storage controller is further configured to increase the number of memory chips provided with the command enqueued to the virtual command queue, when the queue depth of the virtual command queue exceeds a second reference value and an input/output bandwidth of a connection including the virtual command queue is less than or equal to a predetermined level.

* * * * *